US009658852B2

(12) United States Patent
Koehler et al.

(10) Patent No.: US 9,658,852 B2
(45) Date of Patent: May 23, 2017

(54) UPDATING OF SHADOW REGISTERS IN N:1 CLOCK DOMAIN

(71) Applicant: INTERNATIONAL BUSINESS MACHINES CORPORATION, Armonk, NY (US)

(72) Inventors: Thomas Koehler, Holzgerlingen (DE); Frank Lehnert, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/800,136

(22) Filed: Jul. 15, 2015

(65) Prior Publication Data

US 2016/0026401 A1 Jan. 28, 2016

(30) Foreign Application Priority Data

Jul. 23, 2014 (GB) .................................. 1413052.0

(51) Int. Cl.
*G06F 3/06* (2006.01)
*G06F 9/30* (2006.01)

(52) U.S. Cl.
CPC ...... *G06F 9/30116* (2013.01); *G06F 9/30123* (2013.01); *G06F 9/30138* (2013.01)

(58) Field of Classification Search
CPC ........................... G06F 3/0619; G06F 9/30116
See application file for complete search history.

(56) References Cited

U.S. PATENT DOCUMENTS 5,568,380 A * 10/1996 Brodnax ............. G06F 11/1407 700/79
6,128,728 A * 10/2000 Dowling ................. G06F 9/462 710/22

(Continued)

FOREIGN PATENT DOCUMENTS

EP 1313006 A2 5/2003
EP 1277112 B1 9/2003
WO WO2014001765 A1 1/2014

OTHER PUBLICATIONS

Levine et al, "Online Measurement of Timing in Circuits: For Health Monitoring and Dynamic Voltage & Frequency Scaling," Dept. of Electr. & Electron. Eng., Imperial Coll. London, London, UK; Apr. 2012, pp. 1-8.

(Continued)

*Primary Examiner* — David X Yi
*Assistant Examiner* — Zubair Ahmed
(74) *Attorney, Agent, or Firm* — Robert J. Shatto; James L. Olsen

(57) ABSTRACT

A processing unit includes a first storage entity being updated at a first clock cycle (CLK1) for holding a master copy of processing unit state. The processing unit further includes at least two shadow storage entities being updated with update information of the first storage entity. A shadow storage entity running at a second clock cycle (CLK2) is slower than the first clock cycle (CLK1). The first storage entity is coupled with the shadow storage entities via an intermediate storage entity, and the intermediate storage entity provides multiple storage stages for buffering consecutive update information of the first storage entity. Selection circuitry is adapted to provide one update information contained in one storage stage to the shadow storage entity with the active clock edge of the second clock cycle (CLK2) in order to update said shadow storage entity.

20 Claims, 3 Drawing Sheets

(56) References Cited

U.S. PATENT DOCUMENTS

| | | | | |
|---|---|---|---|---|
| 6,681,337 | B1 | 1/2004 | Smith et al. | |
| 7,185,125 | B2 | 2/2007 | Rougnon-Glasson | |
| 8,234,489 | B2 | 7/2012 | Williamson et al. | |
| 2003/0151441 | A1* | 8/2003 | Neff | H03K 5/1504 327/295 |
| 2005/0108482 | A1* | 5/2005 | Fuks | G06F 1/12 711/150 |
| 2005/0138323 | A1 | 6/2005 | Snyder | |
| 2006/0294344 | A1 | 12/2006 | Hsu et al. | |
| 2013/0275700 | A1 | 10/2013 | Wang et al. | |
| 2015/0188649 | A1* | 7/2015 | Buckler | G06F 1/12 370/503 |

OTHER PUBLICATIONS

International Search Report for GB1413052.0 dated Jan. 30, 2015, pp. 1-4.
United Kingdom Application 1413052.0 filed Jul. 23, 2014, Claim Amendments, 3 pgs.
United Kingdom Application 1413052.0, First Office Action, Apr. 27, 2016, 4 pgs.
United Kingdom Application 1413052.0, Response to Office Action, Jun. 20, 2016, 2 pgs.
United Kingdom Application 1413052.0, Notification of Grant, Jul. 19, 2016, 2 pgs.

* cited by examiner

UPDATING OF SHADOW REGISTERS IN N:1 CLOCK DOMAIN

PRIOR FOREIGN APPLICATION

This application claims priority from the United Kingdom patent application number 1413052.0, filed Jul. 23, 2014, which is hereby incorporated herein by reference in its entirety.

BACKGROUND

One or more aspects relate generally to the field of processing units. More specifically, one or more aspects relate to a processing unit including a master storage entity and multiple shadow storage entities, in which the processing unit performs an update routine for updating the shadow storage entities.

In processing units, for example in central processing units (CPUs) of computer systems, a processor subsystem with a CPU-core may hold a master copy of all registers representing the complete architecture state of this CPU-core. The state may be used for recovering the system state (checkpoint restart) after an error has occurred. The architecture state may be updated with every instruction execution of this CPU-core, i.e. according to a first clock cycle time at which the core is operated.

The functional logic of the processing unit may not work directly with the master copy of these registers, but may use local shadow storage entities distributed throughout the CPU-core which can be accessed and updated with lower latency than the master copy. A result bus is distributed throughout the CPU-core in different staging levels, providing updates to all shadow copies at active edges of the first clock cycle.

In typical environments, not all shadow storage entities are actually operating at the first clock cycle. Typically, some of them are associated with subunits running at a slower cycle time than the first clock cycle, which makes it desirable, to operate also these shadow storage entities at a slower cycle time. This, however, causes problems with missing updates from the result bus, since those updates can only be captured by the slower clocked shadow storage entity, if they coincide with the active clock edge at which the shadow storage entity is operating. When updates occur randomly every core cycle, then this coincidence statistically exists only for one out of N updates, i.e. the delivery of the updates to the shadow storage entities cannot be guaranteed.

Other state of the art implementations run the shadow storage entities at core speed, i.e. at first clock cycle time, although actually being used in a slower domain, which is bad for timing and power.

SUMMARY

Based on the foregoing, there is a need for an efficient and reliable transfer of update information to a shadow storage unit being operated at a slower clock cycle with reference to a first storage entity which provides the update information at a higher clock frequency.

One or more embodiments of the present invention provide for a processing unit which transmits update information to a shadow storage unit being operated at a slower clock cycle in an efficient and reliable way.

According to a first aspect, a processing unit including a first storage entity being updated at a first clock cycle for holding a master copy of the processing unit state is provided. The processing unit may be the CPU or a CPU-core of a computing device and the first storage entity may be a master register of the CPU or CPU-core. The processing unit further includes at least two shadow storage entities which may be shadow registers. The shadow storage entities are updated with update information of the first storage entity and are running at a second clock cycle being slower than the first clock cycle. In other words, the frequency of the first clock signal is higher than the frequency of the second clock signal. The frequency of the first clock signal may be an integral multiple of the frequency of the second clock signal, in which the phase position of the first and second clock signal is fixed. Furthermore, the first storage entity is coupled with the shadow storage entities via an intermediate storage entity. The intermediate storage entity provides multiple storage stages for buffering consecutive update information of the first storage entity. The first storage entity may include multiple registers which are connected in series, in which each register constitutes one storage stage. The registers may be clocked with the first clock cycle. A selection circuitry is adapted to provide update information contained in one storage stage to the shadow storage entity with the active clock edge of the second clock cycle in order to update the shadow storage entity.

BRIEF DESCRIPTION OF THE DRAWINGS

In the following, embodiments of the invention will be described in greater detail by way of example only, making reference to the drawings in which.

DETAILED DESCRIPTION

Figure 1:
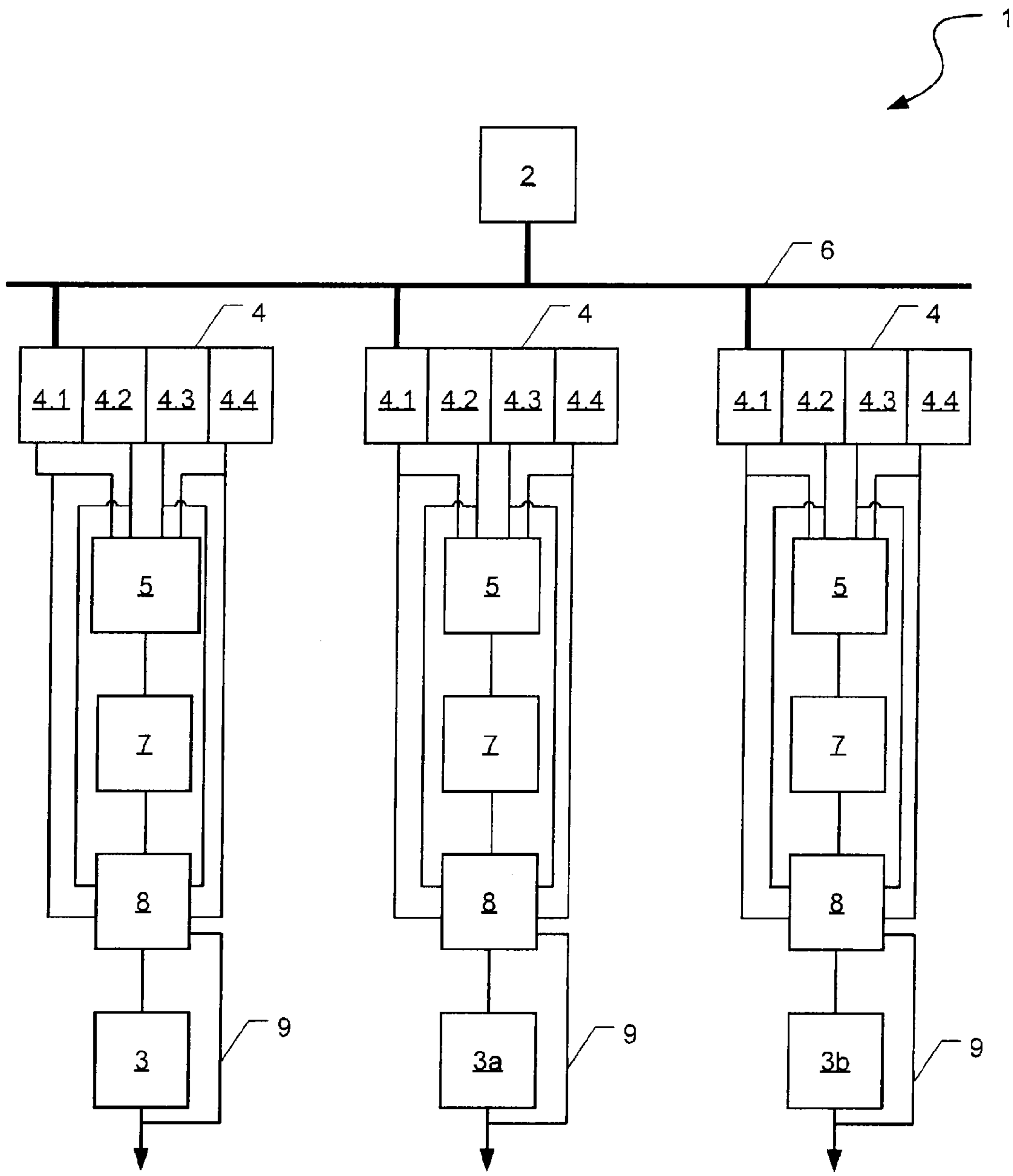
FIG. 1 shows an example schematic block diagram of a processing unit.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an example embodiment of a processing unit 1. The processing unit 1 comprises a first storage entity 2, for example a master register, which may be adapted for holding a master copy of all registers representing the complete architecture state of the processing unit 1. The processing unit 1 may be, for example, a processor subsystem with a CPU-core or, in general a processing entity, wherein the first storage entity 2 is associated to the CPU-core or processing entity in order to provide a copy representing the actual state of the processing entity. The processing entity may be operated at a first clock cycle CLK1 comprising a first clock frequency, wherein the first clock frequency is equal to the CPU clock frequency. Therefore, the first storage entity 2 is also updated in synchronization with the first clock cycle CLK1, i.e. the first storage entity 2 is also operated at the first clock cycle CLK1 in order to store every updated state of the processing entity which may occur at the active clock edge (for example, the rising edge) of the first clock cycle CLK1. In case of an error during instruction execution, a checkpoint restart may be performed based on information of the first storage entity 2.

The processing unit 1 further comprises multiple shadow storage entities 3, 3*a*, 3*b*. The shadow storage entities 3, 3*a*, 3*b* may be distributed throughout the processing unit 1 and may be coupled with the first storage entity 2 by means of a bus 6, specifically a data bus. By means of the bus 6, update information may be provided from the first storage entity 2 to the shadow storage entities 3, 3*a*, 3*b* in order to update the information stored by the shadow storage entities 3, 3*a*, 3*b*. The shadow storage entities 3, 3*a*, 3*b* may be coupled with functional subunits of the processing unit, the functional subunits operating at the second clock cycle CLK 2, the second clock cycle CLK 2 having lower clock speed than the first clock cycle CLK1.

In order to enable the provision of information of the first storage entity 2 operated at the faster first clock cycle CLK1 to the shadow storage entities 3, 3*a*, 3*b* driven at the slower second clock cycle CLK2, the processing unit 1 comprises an intermediate storage entity 4 and selection circuitry 5 by means of which information provided by the first storage entity 2 is buffered and information being addressed to a certain shadow storage entity 3, 3*a*, 3*b* is selected and transferred to the shadow storage entity 3, 3*a*, 3*b* in order to update the shadow storage entity 3, 3*a*, 3*b* at the active edge of the second clock cycle CLK2. Thereby, a reliable transfer of information between the first storage entity 2 and the shadow storage entities 3, 3*a*, 3*b* without loss of data is achieved.

More in detail, the first storage entity 2 is coupled with the intermediate storage entity 4 by means of the bus 6, the bus 6 being operated at the first clock cycle CLK1. When the first storage entity 2 has been updated with update information, the update information is provided to the intermediate storage entity 4 at the active edge of the first clock cycle CLK1. So, the intermediate storage entity 4 may also be operated at the first clock cycle CLK1 in order to receive the update information. The intermediate storage entity 4 may include multiple storage stages 4.1-4.4 wherein each storage stage 4.1-4.4 is adapted to store certain update information provided by the bus 6. In one embodiment, the bus 6 may be coupled with one of the storage stages 4.1-4.4, so one storage stage 4.1 may receive the information provided by the bus 6. The storage stages 4.1-4.4 may be arranged as a storage chain, wherein a storage stage following a precedent storage stage will receive information from the precedent storage stage. In other words, the intermediate storage entity operates like a shift register wherein information is shifted from a precedent storage stage to the following storage stage. Thereby, the intermediate storage entity 4 is adapted to store a set of update information which consecutively occurred at the bus 6.

The intermediate storage entity 4 is coupled with a selection circuitry 5. The selection circuitry 5 is adapted to determine whether certain update information is directed to a certain shadow storage entity 3, 3*a*, 3*b*. In one embodiment, each shadow storage entity 3, 3*a*, 3*b* is associated with its own intermediate storage entity 4 and its own selection circuitry 5. According to other embodiments, a subset of the shadow storage entities 3, 3*a*, 3*b* or all shadow storage entities 3, 3*a*, 3*b* may be coupled with the same intermediate storage entity 4 and/or the same selection circuitry 5, specifically when the functional logic entities being associated with the respective shadow storage entities 3, 3*a*, 3*b* are close to each other.

The selection circuitry 5 may include a plurality of selection circuitry subunits 5.1, 5.2, 5.3, 5.4 (FIG. 2), wherein each selection circuitry subunit 5.1-5.4 is associated with a certain storage stage 4.1-4.4 of the intermediate storage entity 4. Each selection circuitry subunit 5.1-5.4 may be coupled with a correlated storage stage 4.1-4.4 in order to receive information from the storage stage 4.1-4.4. More in detail, the selection circuitry subunit 5.1-5.4 may receive metadata from the storage stage 4.1-4.4 in order to determine if the update information is directed to the shadow storage entity 3, 3*a*, 3*b* being correlated with the selection circuitry 5. The metadata may be directly correlated with the update information, i.e. each storage stage 4.1-4.4 stores information including the update information and the metadata. The metadata may for example include address information indicating the destination shadow storage entity 3, 3*a*, 3*b* and write enable information indicating that the update information should be written into the shadow storage entity 3, 3*a*, 3*b* identified by the address information. In other words, each selection circuitry subunit 5.1-5.4 is adapted to decode metadata associated with the update information in order to determine whether the update information stored in the selection circuitry subunit 5.1-5.4 should be forwarded to the respective shadow storage entity 3, 3*a*, 3 or not.

Figure 2:
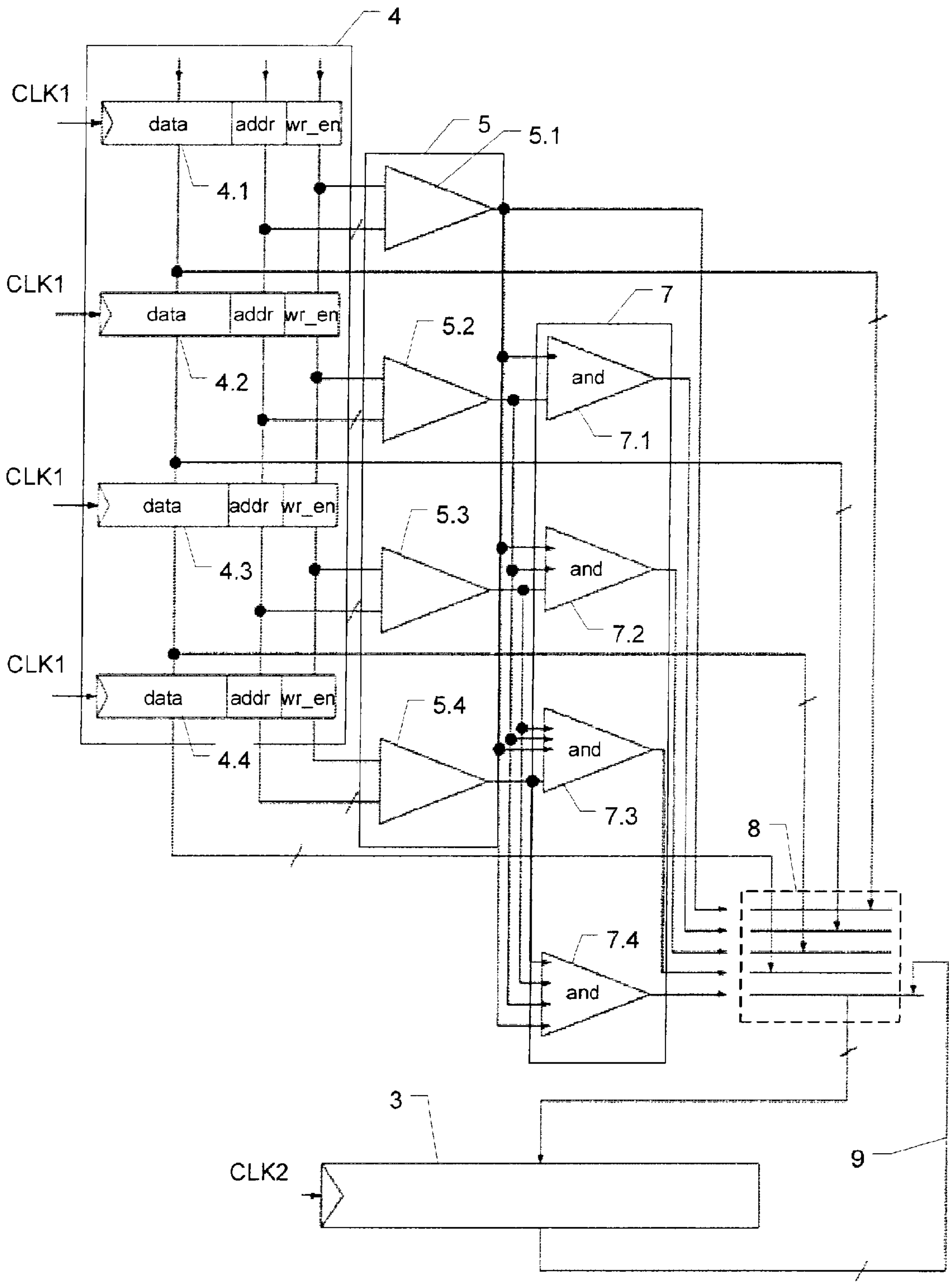
FIG. 2 shows a schematic diagram of an example of the intermediate storage entity, the selection circuitry, the prioritizing circuitry and the transfer circuitry.

Due to the situation that the second clock cycle CLK2 is slower than the first clock cycle CLK1, the situation may occur that the intermediate storage entity 4 comprises multiple update information for a certain shadow storage entity 3, 3*a*, 3*b*. In order to determine which update information has to be written into the shadow storage entity 3, 3*a*, 3*b* at the next active edge of the second clock cycle CLK2, the processing unit 1 comprises a prioritizing circuitry 7. The prioritizing circuitry is adapted to decide which update information of multiple update information being directed to a certain shadow storage entity 3, 3*a*, 3*b* should be written into the shadow storage entity 3, 3*a*, 3*b*. According to one embodiment, the prioritizing circuitry 7 is adapted to determine the most recent update information being directed to the respective shadow storage entity 3, 3*a*, 3*b* and trigger the provision of the most recent update information to the shadow storage entity 3, 3*a*, 3*b*. The prioritizing circuitry 7 may comprise multiple prioritizing circuitry subunits 7.1-7.4 (FIG. 2). Each prioritizing circuitry subunit 7.1-7.4 is adapted to determine whether a storage stage 4.1-4.4 comprises more recent update information for the respective shadow storage entity 3, 3*a*, 3*b*.

The information provided by the selection circuitry 5 and the prioritizing circuitry 7 may be used for forwarding certain update information comprised within a storage stage 4.1-4.4 to the shadow storage entity 3, 3*a*, 3*b*. The processing unit 1 may comprise a transfer circuitry 8 which may include multiple inputs for receiving the update information of the storage stages 4.1-4.4 and one or more switching inputs for receiving switching information provided by the prioritizing circuitry 7. The transfer circuitry 8 may forward update information to the shadow storage entity 3, 3*a*, 3*b* based on the received switching information. The switching information may indicate the most recent update information stored in a certain storage stage 4.1-4.4 which is directed to the respective shadow storage entity 3, 3*a*, 3*b*. The transfer circuitry 8 may be adapted to provide the most recent update information to the shadow storage entity.

Furthermore, the prioritizing circuitry 7 may also be adapted to provide information indicating that no update information comprised within the intermediate storage entity 4 is directed to the respective shadow storage entity 3, 3*a*, 3*b*. In order to keep information within the shadow storage entity 3, 3*a*, 3*b*, the processing unit 1 comprises a hold circuitry 9. If the output of the prioritizing circuitry 7 indicates that no new update information is available, the hold circuitry 9 is adapted to provide the current information stored in the shadow storage entity 3, 3*a*, 3*b* to a data input of said shadow storage entity 3, 3*a*, 3*b*. In other words, the hold circuitry 9 forms a feedback loop by means of which the actual information stored within the shadow storage entity 3, 3*a*, 3*b* is maintained in the following second clock cycle CLK2 if the prioritizing circuitry 8 indicates that no new update information is available for the respective shadow storage entity 3, 3*a*, 3*b*.

FIG. 2 illustrates the circuitry providing clock domain transition in closer detail. According to the embodiment of FIG. 2, the first clock cycle CLK1 may be four times faster than the second clock cycle CLK2. Thus, the intermediate storage entity 4 includes four storage stages 4.1-4.4 in order to buffer update information occurring between two active edges of the second clock cycle CLK2. Each storage stage 4.1-4.4 may be constituted by a register, in which each register is operated or triggered by the first clock cycle CLK1. Each storage stage 4.1-4.4 is adapted to store update information in correlation with metadata comprising address information and write enable information. The storage stages 4.1-4.4 are coupled with each other in the form of a storage chain wherein only the first storage stage 4.1 receives information directly from the bus 6 and the information of the first storage stage 4.1 is provided to the second storage stage 4.2 according to the first clock cycle CLK1. In other words, the information is forwarded from one storage stage to the next storage stage according to the active edge of the first clock cycle CLK1.

The selection circuitry 5 also comprises four selection circuitry subunits 5.1-5.4, so the number of selection circuitry subunits 5.1-5.4 is equal to the ratio of the frequency of the first clock cycle CLK1 to the frequency of the second clock cycle CLK2. Each selection circuitry subunit 5.1-5.4 comprises an input for receiving the address information and the write-enable information of a certain storage stage 4.1-4.4. The selection circuitry subunit may be adapted to determine whether certain update information correlated with the address information and the write enable information should be provided to the respective shadow storage entity 3. More in detail, the selection circuitry subunit 5.1-5.4 may be adapted to compare the address information with a reference address information being correlated with the shadow storage entity 3 and to evaluate the write enable information. If the address information is equal to the reference address information and the write enable information indicates that the respective update information should be written into the shadow storage entity 3, the selection circuitry subunit 5.1-5.4 provides enable information at its output. The enable information indicates that the update information stored within the respective storage stage 4.1-4.4 should be written into the shadow storage entity 3.

Similarly to the selection circuitry 5, the prioritizing circuitry 7 includes four prioritizing circuitry subunits 7.1-7.4, i.e. the number of prioritizing circuitry subunits 7.1-7.4 is equal to the ratio of the first clock cycle CLK1 to the second clock cycle CLK2. According to one embodiment, each prioritizing circuitry subunit 7.1-7.4 is constituted by an AND-gate. Each prioritizing circuitry subunit 7.1-7.4 may receive at least one enable information of a higher-level selection circuitry subunit 5.1-5.4 in order to determine if more recent update information is available which should be forwarded to the shadow storage entity 3. The enable information of the higher level selection circuitry subunits 5.1-5.4 may be received at inverting inputs of the respective prioritizing circuitry subunit 7.1-7.3. In addition, the enable information of the selection circuitry subunit 5.1-5.4 correlated with the respective prioritizing circuitry subunit 7.1-7.3 may be received at a non-inverting input of the prioritizing circuitry subunit 7.1-7.3. In addition, the prioritizing circuitry 7 may include a prioritizing circuitry subunit 7.4 which receives all enable information provided by the selection circuitry subunits 5.1-5.4 at inverted inputs. The prioritizing circuitry subunit 7.4 may provide prioritizing information indicating that no update information contained in the intermediate storage entity 4 has to be written into the shadow storage entity 3. The information may be used for triggering the hold circuitry 9, which is described later on.

The prioritizing information provided by the outputs of the prioritizing circuitry 7 is transmitted to the transfer circuitry 8. The transfer circuitry may be constituted by a multiplexer. The transfer circuitry may comprise a data interface for receiving update information from the intermediate storage entity 4, specifically from the respective storage stages 4.1-4.4 of the intermediate storage entity 4. Furthermore, the transfer circuitry 8 may comprise a control interface for receiving the prioritizing information provided by the prioritizing circuitry 7. The transfer circuitry 8 is adapted to forward the update information provided by the intermediate storage entity 4 to the shadow storage entity 3 according to the prioritizing information received at the control interface. For example, if the information provided by the selection circuitry 5 indicates that the update information comprised within the first and the third storage stage 4.1, 4.3 should be written to shadow storage entity 3, the prioritizing circuitry 7 may indicate that the update information comprised within the first storage stage 4.1 should be prioritized because it is the most recent update information provided by the first storage entity 2. Therefore, the transfer circuitry 8 may provide the update information stored within the first storage stage 4.1 to the shadow storage entity 3.

If the prioritizing circuitry 7 indicates that no update information should be provided to the shadow storage entity 3 (e.g. because the address information correlated with the respective update information does not match with the address of the shadow storage entity 3), the hold circuitry 9 may be activated.

The hold circuitry 9 is adapted to provide the information actually stored in the shadow storage entity 3 to the input of the shadow storage entity 3 in order to store the information once again during the next active clock edge of the second clock cycle CLK2. The hold circuitry 9 may be constituted by a feedback loop coupling the output of the shadow storage entity 3 with the input of the shadow storage entity 3. In one embodiment, the hold circuitry 9 includes the transfer circuitry 8, i.e. the hold circuitry 9 feeds back the information stored in the shadow storage entity 3 to the transfer circuitry 8. In case that the prioritizing circuitry 7 indicates that no update information arrived since the last update of the shadow storage entity 3, the information which has already been stored in the shadow storage entity 3 is once again written into the shadow storage entity 3. Thereby, the shadow storage entity 3 always stores the latest information available at the active clock edge of the shadow storage entity 3.

Figure 3:
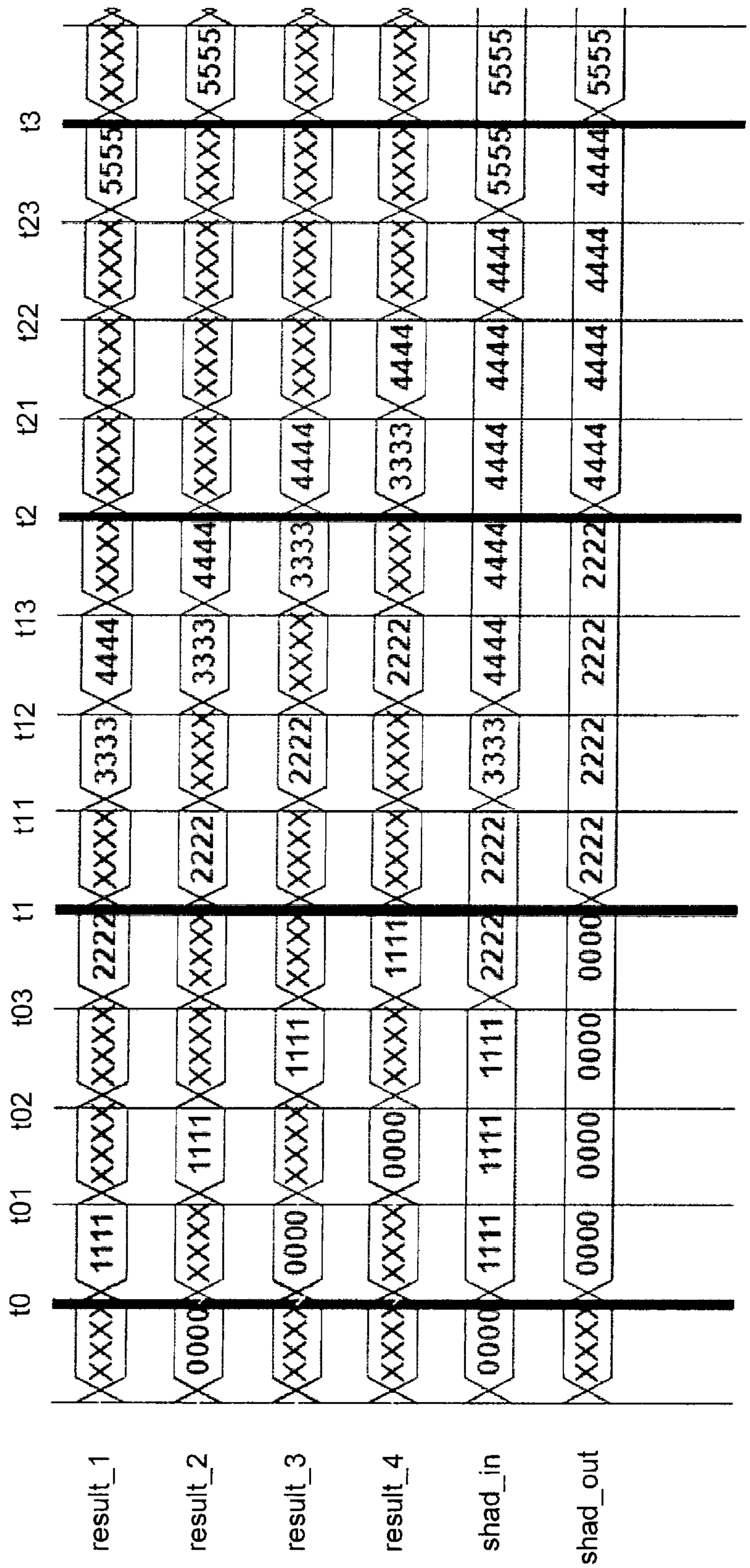
FIG. 3 shows a timing diagram indicating the process of updating a shadow storage entity, in one embodiment.

FIG. 3 shows the process of updating a shadow storage entity 3 by means of an example timing diagram. The bold vertical lines indicate the active edges of the second clock cycle CLK2 wherein the light vertical lines indicate the active edges of the first clock cycle CLK1. The signals result_1, result_2, result_3 and result_4 refer to the update information provided by the respective storage stages 4.1-4.4 of the intermediate storage entity 4 to the transfer circuitry. The signal shad_in indicates the input data provided to the shadow storage entity 3, and shad_out indicates the output data provided at the output interface of the shadow storage entity 3. At time t0, the update information provided by the second storage stage 4.2 is 0000, wherein the update information provided by all other storage stages is invalid (e.g., not directed to the shadow storage entity 3). Therefore, at the active edge of the second clock cycle, shad_out changes to 0000.

With the active clock edge of CLK1 at t0, result_1 changes from XXXX to 1111, i.e. new update information directed to the shadow storage entity 3 is received at the intermediate storage entity 4. Therefore, at t0, also shad_in changes, namely from 0000 to 1111. However, the information is not immediately provided to the shadow storage entity 3 because there is no active edge of the second clock cycle CLK2. In the following first clock cycles CLK1, the update information 1111 is forwarded to the following storage stages 4.2-4.4. At time t03, new update information 2222 is received at the input of storage stage 4.1. The update information 2222 is newer than the previously received update information 1111. Therefore, the prioritizing circuitry 7 provides update information 2222 towards the shadow storage entity 3 at the next active edge of the second clock cycle CLK2, i.e. update information 2222 appears at the output interface of shadow storage entity 3 at the next active edge of the second clock cycle CLK2.

As described herein, according to a first aspect, a processing unit including a first storage entity being updated at a first clock cycle for holding a master copy of the processing unit state is provided. The processing unit may be the CPU or a CPU-core of a computing device and the first storage entity may be a master register of the CPU or CPU-core. The processing unit further includes at least two shadow storage entities which may be shadow registers. The shadow storage entities are updated with update information of the first storage entity and are running at a second clock cycle being slower than the first clock cycle. In other words, the frequency of the first clock signal is higher than the frequency of the second clock signal. The frequency of the first clock signal may be an integral multiple of the frequency of the second clock signal, in which the phase position of the first and second clock signal is fixed. Furthermore, the first storage entity is coupled with the shadow storage entities via an intermediate storage entity. The intermediate storage entity provides multiple storage stages for buffering consecutive update information of the first storage entity. The first storage entity may include multiple registers which are connected in series, in which each register constitutes one storage stage. The registers may be clocked with the first clock cycle. A selection circuitry is adapted to provide update information contained in one storage stage to the shadow storage entity with the active clock edge of the second clock cycle in order to update the shadow storage entity.

Advantageously, the intermediate storage entity stores update information being transmitted by the first storage entity in order to pick out one update information; for example, the latest one in order to update the shadow storage entity at the active edge of the second clock cycle. Thereby, an efficient and reliable update process of the shadow storage entity is obtained and update losses are avoided because the shadow storage entity is updated when update information directed to the respective shadow storage entity is received at the intermediate storage entity within a second clock cycle.

According to an embodiment, the first storage entity is coupled with the intermediate storage entity via a bus, the bus being operated at the first clock cycle. The bus may provide the update information to the intermediate storage entity at the active edge of the first clock cycle. By means of the intermediate storage entity being clocked with the same clock signal as the bus, a reliable update information transfer without loss of information because of missing coincidence of clock edges is achieved.

According to an embodiment, the intermediate storage entity includes a chain of registers, the registers being operated at the first clock frequency. In one embodiment, each storage stage may be constituted by one register of the register chain. The registers may store the update information for one clock cycle of the first clock signal and provide the update information to the selection circuitry. The registers may forward the stored information with the following active edge to the next register of the register chain. In other words, the intermediate storage entity includes a shift register with a plurality of registers, in which the information of all registers are forwarded to the selection circuitry. Thereby, a set of consecutive update information is available at the selection circuitry in order to update the shadow storage entity.

According to a further embodiment, the number of storage stages of the intermediate storage entity is equal to the ratio of the frequency of the first clock cycle to the frequency of the second clock cycle. Thereby, all update information being forwarded by the first storage entity to the intermediate storage entity can be buffered and are available at the next active edge of the second clock cycle.

According to a further embodiment, each storage stage is adapted to store update information and metadata correlated with the update information. The update information may be indicative for the actual state of the processing unit and the metadata may include additional information which may, for example, be used for routing the update information to the respective shadow storage entity.

According to a further embodiment, the metadata includes address information for indicating the destination shadow storage entity and a write enable information. The update information may only be forwarded to the respective shadow storage entity if the address information corresponds to the address of the shadow storage entity and the write enable information is indicating a write approval.

According to a further embodiment, the selection circuitry is adapted to enable the provision of update information to a specific shadow storage entity based on the metadata. The selection circuitry may read the metadata stored in a respective storage stage, compare the address information with the address information of one or more shadow storage entities and forward the update information to the respective shadow storage entity if the enabling information indicates a write approval.

According to a further embodiment, each shadow storage entity is correlated with a separate selection circuitry and/or intermediate storage entity. So, the intermediate storage entity may store a set of update information provided by the bus (irrespective of the addressed shadow storage entity), and the selection circuitry may only route update information to its correlated shadow storage entity which is directed to the shadow storage entity. Thereby, clock latency problems can be avoided.

According to a further embodiment, the processing unit includes a prioritizing circuitry for prioritizing the update information stored within the intermediate storage entity. For example, the prioritizing circuitry may be adapted to prioritize the update information based on the point of time the update information has been provided to the intermediate storage entity. Thereby, it is possible to select one update information out of a plurality of update information if multiple update information are directed to the intermediate storage entity during a second clock cycle.

According to a further embodiment, the prioritizing circuitry is adapted to indicate the most recent update information out of the set of update information stored within the intermediate storage entity. Based on the indicator, the most recent update information may be provided to the shadow storage entity.

According to a further embodiment, a transfer circuitry is adapted to provide one of the consecutive update information to the shadow storage entity based on information provided by the selection circuitry and the prioritizing circuitry. The prioritizing circuitry may forward an indicator to the transfer circuitry based on which the transfer circuitry may forward the most recent update information to the shadow storage entity. The transfer circuitry may be, for example, a multiplexer, and the indicator may be used as switching information for switching update information provided at a certain input to a respective output of the multiplexer.

According to a further embodiment, the shadow storage entity includes hold circuitry, the hold circuitry being adapted to provide previous update information to the shadow storage entity if no new update information is received within a clock cycle of the second clock signal. For example, the prioritizing circuitry may provide information indicating that no new information is received during a second clock cycle. Based on the information, the hold circuitry may be activated which may provide information already stored within the shadow storage entity once again to the input of the shadow storage entity in order to keep the information within the shadow storage entity. The hold circuitry may comprise a feedback loop connecting the output of the shadow storage entity with the transfer circuitry.

According to a second aspect, a method for updating shadow storage entities of a processing unit is provided. The processing unit includes a first storage entity being updated at a first clock cycle for holding a master copy of the processing unit state. The processing unit further includes at least two shadow storage entities being updated with update information of the first storage entity, the shadow storage entities running at a second clock cycle being slower than the first clock cycle. The method includes, for instance, providing update information from the first storage entity to an intermediate storage entity, the intermediate storage entity including multiple storage stages for buffering consecutive update information of the first storage entity; selecting one update information contained in one storage stage and providing the selected update information to the shadow storage entity with the active clock edge of the second clock cycle; and updating the shadow storage entity based on the selected update information.

According to a third aspect, a computer-readable medium is provided. The computer-readable medium comprises computer-readable program code embodied therewith which, when executed by a processor, cause the processor to execute a method as mentioned above.

What is claimed is:

1. A processing unit comprising:

a first storage entity being updated at a first clock cycle (CLK1) for holding a master copy of processing unit state; and at least two shadow storage entities being updated with update information of the first storage entity, the at least two shadow storage entities running at a second clock cycle (CLK2) being slower than the first clock cycle (CLK1), wherein the first storage entity is coupled with the at least two shadow storage entities via an intermediate storage entity, said intermediate storage entity providing multiple storage stages for buffering consecutive update information of the first storage entity, wherein a number of storage stages in the intermediate storage entity is equal to the ratio of the frequency of the first clock cycle (CLK1) to the frequency of the second clock cycle (CLK2), wherein a selection circuitry is adapted to provide one update information contained in one storage stage to a shadow storage entity with an active clock edge of the second clock cycle (CLK2) in order to update said shadow storage entity.

2. The processing unit according to claim 1, wherein the first storage entity is coupled with the intermediate storage entity via a bus, the bus being operated at the first clock cycle (CLK1).

3. The processing unit according to claim 1, wherein the intermediate storage entity comprises a chain of registers, said registers being operated at the first clock cycle (CLK1), wherein each storage stage is constituted by one register of the chain of registers, and wherein a first storage stage is configured to receive update information from a second storage stage.

4. The processing unit according claim 1, wherein each storage stage is adapted to store update information and metadata correlated with said update information.

5. The processing unit according to claim 4, wherein said metadata comprises address information for indicating a destination shadow storage entity and write enable information.

6. The processing unit according to claim 4, wherein the selection circuitry is adapted to enable provision of update information to a specific shadow storage entity based on said metadata.

7. The processing unit according to claim 1, wherein each shadow storage entity is correlated with at least one of a separate selection circuitry or an intermediate storage entity.

8. The processing unit according to claim 1, further comprising a prioritizing circuitry for prioritizing update information stored within the intermediate storage entity.

9. The processing unit according to claim 8, wherein the prioritizing circuitry is adapted to indicate most recent update information out of the update information stored within the intermediate storage entity.

10. The processing unit according to claim 8, wherein a transfer circuitry is adapted to provide one of the consecutive update information to the shadow storage entity based on information provided by the selection circuitry and the prioritizing circuitry.

11. The processing unit according to claim 1, wherein the shadow storage entity comprises a hold circuitry, said hold circuitry being adapted to provide previous update information to the shadow storage entity if no new update information is received within a second clock cycle.

12. A method of updating shadow storage entities of a processing unit, the method comprising:

providing update information from a first storage entity of the processing unit to an intermediate storage entity, said intermediate storage entity comprising multiple storage stages for buffering consecutive update information of the first storage entity, the first storage entity being updated at a first clock cycle (CLK1) for holding a master copy of processing unit state;

selecting one update information contained in one storage stage and providing said selected one update information to a selected shadow storage entity of the processing unit, the processing unit comprising at least two shadow storage entities being updated with update information of the first storage entity, the at least two shadow storage entities running at a second clock cycle (CLK2) being slower than the first clock cycle (CLK1), the selected shadow storage entity having an active clock edge of the second clock cycle (CLK2); and updating said selected shadow storage entity based on said selected one update information, wherein a number of storage stages in the intermediate storage entity is equal to the ratio of the frequency of the first clock cycle (CLK1) to the frequency of the second clock cycle (CLK2).

13. The method according to claim 12, wherein each storage stage stores update information and metadata correlated with said update information.

14. The method according to claim 12, further comprising prioritizing update information stored within the intermediate storage entity.

15. The method according to claim 14, wherein the prioritizing comprises indicating most recent update information out of the update information stored within the intermediate storage entity.

16. A computer program product for updating shadow storage entities of a processing unit, the computer program product comprising:

a non-transitory computer readable storage medium readable by a processing circuit and storing instructions for execution by the processing circuit for performing a method comprising:

providing update information from a first storage entity of the processing unit to an intermediate storage entity, said intermediate storage entity comprising multiple storage stages for buffering consecutive update information of the first storage entity, the first storage entity being updated at a first clock cycle (CLK1) for holding a master copy of processing unit state;

selecting one update information contained in one storage stage and providing said selected one update information to a selected shadow storage entity of the processing unit, the processing unit comprising at least two shadow storage entities being updated with update information of the first storage entity, the at least two shadow storage entities running at a second clock cycle (CLK2) being slower than the first clock cycle (CLK1), the selected shadow storage entity having an active clock edge of the second clock cycle (CLK2); and updating said selected shadow storage entity based on said selected one update information, wherein a number of storage stages in the intermediate storage entity is equal to the ratio of the frequency of the first clock cycle (CLK1) to the frequency of the second clock cycle (CLK2).

17. The computer program product according to claim 16, wherein each storage stage stores update information and metadata correlated with said update information.

18. The computer program product according to claim 16, wherein the method further comprises prioritizing update information stored within the intermediate storage entity.

19. The processing unit of claim 1, wherein there are at least three shadow storage entities, wherein each of the at least three shadow storage entities are located on an identical device as the first storage entity, wherein each of the at least three shadow storage entities is communicatively coupled to its own separate selection circuitry and intermediate storage entity.

20. The method of claim 12, the method further comprising:

determining, by a selection circuit, that update information provided to the intermediate storage entity is directed to a particular shadow storage entity of the at least two shadow storage entities;

storing a first update in a first storage stage at a first active edge of the first clock cycle;

transferring the first update to a second storage stage at a second active edge of the first clock cycle;

storing a second update in the first storage stage at the second active edge of the first clock cycle;

determining, by a prioritizing circuit and at a first active edge of the second clock cycle, that the second update is a more recent than the first update;

storing, in response to determining that the second update is more recent than the first update, the second update in the particular shadow storage entity shadow storage entity;

determining, at a second active edge of the second clock cycle, that an update for the particular shadow register was not received between the first and second active edges of the second clock cycle; and storing the second update in the particular shadow storage entity at the second active edge of the second clock cycle.

* * * * *